United States Patent
Chakraborty et al.

(10) Patent No.: US 10,284,011 B2
(45) Date of Patent: May 7, 2019

(54) ELECTRICITY DISTRIBUTION SYSTEM WITH DYNAMIC COOPERATIVE MICROGRIDS FOR REAL-TIME OPERATION

(71) Applicant: NEC Corporation, Tokyo (JP)

(72) Inventors: Shantanu Chakraborty, Tokyo (JP); Shin Nakamura, Tokyo (JP); Toshiya Okabe, Tokyo (JP); Kenichi Maruhashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 257 days.

(21) Appl. No.: 15/305,031

(22) PCT Filed: Apr. 23, 2014

(86) PCT No.: PCT/JP2014/062037
§ 371 (c)(1),
(2) Date: Oct. 18, 2016

(87) PCT Pub. No.: WO2015/162804
PCT Pub. Date: Oct. 29, 2015

(65) Prior Publication Data
US 2017/0194814 A1     Jul. 6, 2017

(51) Int. Cl.
*H02J 3/38* (2006.01)
*G06Q 10/06* (2012.01)
(Continued)

(52) U.S. Cl.
CPC ........ *H02J 13/0079* (2013.01); *G05B 13/021* (2013.01); *G06Q 10/06* (2013.01);
(Continued)

(58) Field of Classification Search
CPC .................................................. H02J 13/0079
(Continued)

(56) References Cited

U.S. PATENT DOCUMENTS 9,246,334 B2 * 1/2016 Ansari ............... H02J 13/0013
2011/0231028 A1 9/2011 Ozog
(Continued)

FOREIGN PATENT DOCUMENTS

EP         2533389 A2     12/2012
JP       2011-083086 A      4/2011
(Continued)

OTHER PUBLICATIONS

Hatziargyriou, Nikos, et al. "Microgrids.";IEEE power and energy magazine;5.4 (2007): pp. 78-94. (Year: 2007).*

(Continued)

*Primary Examiner* — Satish Rampuria
(74) *Attorney, Agent, or Firm* — Wilmer Cutler Pickering Hale and Dorr LLP

(57) ABSTRACT

System and methods for performing microgrids cooperation by optimal coalition formation in a distribution network are disclosed. A Microgrid Cooperation Module (MCM) is designed for utility EMS. MCM contains a coalition formation unit and an energy exchange decision unit. Furthermore, a communication protocol for energy exchange between two microgrids is designed. The coalition formation unit applies an innovative hierarchical coalition formation algorithm to provide optimal coalition for real time operation. The real time energy status of microgrids will be provided to coalition formation unit which will determine the coalitions (given a distance threshold) among microgrids to minimize the power loss. Energy exchange decision unit then determine actual energy transfer between pairs of microgrids within a coalition. Upon receiving the energy transfer information through a communication channel, the microgrids will start communicating and process energy transfer. The optimality of the formed coalitions is ensured by performing coalitional game theoretical analysis.

7 Claims, 12 Drawing Sheets

(51) Int. Cl.
*G06Q 50/06* (2012.01)
*H02J 13/00* (2006.01)
*G05B 13/02* (2006.01)

(52) U.S. Cl.
CPC .............. *G06Q 50/06* (2013.01); *H02J 3/382* (2013.01); *Y02E 40/72* (2013.01); *Y02E 40/76* (2013.01); *Y04S 10/123* (2013.01); *Y04S 10/545* (2013.01)

(58) Field of Classification Search
USPC ................................................ 700/286–306
See application file for complete search history.

(56) References Cited

U.S. PATENT DOCUMENTS

| | | | |
|---|---|---|---|
| 2012/0035778 A1* | 2/2012 | Kong | G06Q 30/018 700/295 |
| 2012/0226384 A1* | 9/2012 | Forbes, Jr. | G06Q 10/00 700/291 |
| 2012/0245744 A1* | 9/2012 | Prosser | H02J 3/46 700/286 |
| 2013/0024042 A1 | 1/2013 | Asghari et al. | |
| 2013/0035802 A1* | 2/2013 | Khaitan | G06F 1/263 700/297 |
| 2013/0041516 A1* | 2/2013 | Rockenfeller | H02J 3/38 700/287 |
| 2013/0046668 A1 | 2/2013 | Al Faruque et al. | |
| 2013/0076140 A1 | 3/2013 | Darden et al. | |
| 2013/0085921 A1 | 4/2013 | Nguyen et al. | |
| 2013/0218355 A1* | 8/2013 | Lazaris | G06Q 30/0605 700/291 |
| 2014/0236365 A1* | 8/2014 | Martin | H04B 3/54 700/286 |
| 2014/0249688 A1* | 9/2014 | Ansari | H02J 3/46 700/297 |

FOREIGN PATENT DOCUMENTS

| | | |
|---|---|---|
| JP | 2013-169137 A | 8/2013 |
| WO | WO-2012/105105 A1 | 8/2012 |
| WO | WO-2014/057304 A1 | 4/2014 |
| WO | WO-2014/057599 A1 | 4/2014 |
| WO | WO-2014/057601 A1 | 4/2014 |

OTHER PUBLICATIONS

Wei, Chao, et al. "GT-CFS: A game theoretic coalition formulation strategy for reducing power loss in micro grids.";IEEE Transactions on Parallel and Distributed Systems;25.9 (2014): pp. 2307-2317. (Year: 2014).*

Dall'Anese, Emiliano, Hao Zhu, and Georgios B. Giannakis. "Distributed Optimal Power Flow for Smart Microgrids.";IEEE Trans. Smart Grid;4.3 (2013): pp. 1464-1475. (Year: 2013).*

Wei, Chao, et al. "On optimally reducing power loss in micro-grids with power storage devices.";IEEE Journal on Selected Areas in Communications;32.7 (2014): pp. 1361-1370. (Year: 2014).*

Saad, Walid, Zhu Han, and H. Vincent Poor. "Coalitional game theory for cooperative micro-grid distribution networks." Communications Workshops (ICC), 2011 IEEE International Conference on. IEEE, 2011.pp. 1-5 (Year: 2011).*

International Search Report corresponding to PCT/JP2014/062037, dated Feb. 9, 2015, 4 pages.

Wei, Chao et al., "GT-CFS: A Game Theoretic Coalition Formulation Strategy for Reducing Power Loss in Micro Grids", IEEE Transactions on Parallel and Distributed Systems, vol. 25, No. 9, Jul. 23, 2013 (retrieved Sep. 2014), pp. 2307-2317.

Bari, Ataul et al., "Challenges in the Smart Grid Applications: An Overview", International Journal of Distributed Sensor Networks, vol. 2014, 11 pages.

Nehrir, M.H., et al., "A Review of Hybrid Renewable/Alternative Energy Systems for Electric Power Generation: Configurations, Control, and Applications", IEEE Transactions on Sustainable Energy, vol. 2, No. 4, Oct. 2011, pp. 392-403.

Japanese Office Action issued by the Japan Patent Office for Japanese Application No. 2016-563005 dated Nov. 21, 2017 (4 pages).

Japanese Office Action issued by the Japan Patent Office for Japanese Application No. 2016-563005 dated Sep. 5, 2017 (8 pages).

* cited by examiner ously. Such an entity
ELECTRICITY DISTRIBUTION SYSTEM WITH DYNAMIC COOPERATIVE MICROGRIDS FOR REAL-TIME OPERATION

CROSS-REFERENCE TO RELATED APPLICATIONS

This application is a national stage application of International Application No. PCT/JP2014/062037 entitled "ELECTRICITY DISTRIBUTION SYSTEM WITH DYNAMIC COOPERATIVE MICROGRIDS FOR REAL-TIME OPERATION," filed on Apr. 23, 2014, the disclosure of which is hereby incorporated by reference in its entirety.

TECHNICAL FIELD

The present invention is in the technical field of electricity distribution system and microgrid system. More particularly, the present invention is in the technical field of energy optimization and power loss minimization in the utility grid covering the electricity distribution system by dynamic formation of microgrids cooperation inside that distribution system.

BACKGROUND ART

Description of the Related Art

1. US 2013/0046668 A1 (U.S. patent application Ser. No. 13/276,392), "Aggregator-based electric microgrid for residential applications incorporating renewable energy sources":

This patent provides a design of microgrid incorporating a group of residential consumers and an arrangement between the utility company and the microgrid. General utility-to-residential consumer architecture has been transformed by forming aggregator based microgrids containing plurality of residential consumers.

2. Article titled, "GT-CFS: A Game Theoretic Coalition Formulation Strategy for Reducing Power Loss in Micro Grids", 2013, IEEE Transactions on Parallel and Distributed Systems:

This article presents a distributed approach to form coalition mechanism using merge-split based coalition scheme for microgrids. In this model, the microgrids are assumed to be inter-connected with each other by low-voltage line (Mesh connection) while connected with medium-voltage line with utility grid. Each microgrid has to exchange the spatial and energy status information of other microgrids, in a regular interval (via smart-meter). The coalition is formed by merge/split operation. Merge/split can provide stable partition (Introduced and proved in Article, "K. R. Apt and A. Witzel, "A generic approach to coalition formation," International Game Theory Review, vol. 11, no. 03, pp. 347-367, 2009."). The real-time operation cannon to be realized due to the computational complexity or Merge/Split and communication complexity of the assumed distributed operation. The computational complexity of merge and split operation is $O(2^{|N|})$ for worst case (where N is the set of microgrids). Therefore, merge/split operation is a NP-hard problem (Article, "Complexity of Merging and Splitting for the Probabilistic Banzhaf Power Index in Weighted Voting Games", Proceedings of the 2010 conference on ECAI 2010: 19th European Conference on Artificial Intelligence).

3. US 2013/0085921 A1 (U.S. patent application Ser. No. 13/248,318), "Home energy collaborative mesh platform":

This patent provides a communicated framework installed in homes to form a collaborated platform for energy exchange.

4. US 2011/0231028 A1 (U.S. patent application Ser. No. 13/080,541), "Optimize microgrid energy use and distribution":

This patent provides a system to optimize energy distribution, energy use, and cost of service by using forecasted data of individualistic user demand, energy price, etc.

Also, this patent provides system and method for energy optimization within a microgrid by using end user forecasted data, their preferences and associated weather information.

5. US 2013/0024042 A1 (U.S. patent application Ser. No. 13/543,818), "Method for real time power management of a grid-tied microgrid to extend storage lifetime and reduce cost of energy":

This patent provides a management framework to achieve maximum energy storage lifetime based on energy device life estimation and price of energy.

6. US 2013/0076140 A1 (U.S. patent application Ser. No. 13/247,944), "System and methods for microgrid power generation and management"

This patent provides methods for coordinating energy resources and loads within a distribution system locating over a predetermined geographical area.

BACKGROUND OF THE INVENTION

The deregulation in electricity market coupled with the introduction of smart grid necessitate a portion of electricity distribution system (DS) to be renovate by grouping several distributed energy resources (DERs), storages and loads onto one interactive and automated entity. Such an entity formation idea incepted the concept of microgrid Depending on the geographical area (and/or some spatial constraints); a DS might contain quite a lot of microgrids which need to be managed efficiently. The operating modes of a microgrid are envisioned to have 1) grid-connected mode, where the microgrid will be connected with the utility grid through a bi-directional energy and communication flow line, and 2) the islanding mode, where a microgrid will operate in isolation without any connection with utility.

A microgrid requires power exchange with the utility company (or simply utility) to ensure the balance between its supply and demand. The supply and demand are varied dynamically with time depending on the energy requirements. Microgrid's internal energy management system is responsible to point out such energy difference in real time. Power exchange with utility, however, incurs losses in power due to the presence of voltage transformer in microgrid's substation since the utility operates on medium voltage lines whereas the microgrids operate on low voltage lines. Moreover, due to the presence of renewable sources in microgrids, the demand curve contains uncertainties which imposes extra burden to utility grid in case of real-time operation. Therefore, it is highly expected from the system to minimize the real-time energy burden on utility. Additionally, the energy requirements on the utility companies should be minimized since these companies mostly rely on fuel based power system to provide bulk of power to supply end consumers.

Therefore, in smart grid environment, the emphasis is given to maximize the energy usage of local energy resources. Additionally, in order to manage a huge number of microgrids, the utility energy management system has to be scalable and as optimized as possible, especially in the case of real-time or near-real-time operation. Thus, the electricity distribution system architecture needs to be able to perform the real time operations which will 1. Minimize the energy burden on utility grid
2. Maximize the local energy usage in and within the microgrids as much as possible
3. Minimize the incurred power loss on the network.

SUMMARY OF INVENTION

The present invention addresses the needs remaining in the art and relates to modeling electric distribution system and appropriate methods to ensure the real time and optimal energy exchange operation by dynamic formation of cooperative microgrids.

Distribution System Modeling

The present invention models the smart distribution system which contains several microgrids, a utility company and the interconnected network for communication. Every microgrid in the distribution system is expected to connect with the utility grid through medium voltage line. A microgrid can be connected with another microgrid with low voltage line. During the time of operation, every microgrid will send their energy status (via microgrid's energy controller unit; ECU) to utility company (received by utility Energy Management System; EMS). The utility EMS contains Microgrid Cooperation Module (MCM; designed for the purpose of the invention and will be detailed in later part of the document), which is responsible for decide optimal coalition. The energy transfer matrix, resulted from MCM, will be sent to the participated microgrids via communication system. The microgrids will communicate pairwise to initiate the energy transfer and realize the transfer via low-voltage line. The communication module is also designed for the purpose of the invention (detailed later part of the document).

Example of Energy Exchange within Microgrids

Microgrids cooperation can be realized by effective power exchange within microgrids. The inter-microgrid exchanged power maximization will inherently minimize the burden to utility grid. For example, microgrid A requires 10 kWh of energy at a certain period while microgrid B has 6 kWh of extra energy. In conventional electricity distribution system (hereinafter, referenced as distribution system), A will be connected to the utility to purchase 10 kWh of energy and B will sell 6 kWh of energy and thereby necessitates a process of total 16 kWh of energy exchange in the distribution and utility grid. The 16 kWh of energy transfer will produce a certain amount of power loss. Now, if A and B form a coalition to cooperate and manage energy exchange (i.e. B will provide 6 kWh to A and thus requires A to purchase only 4 kWh from utility), the burden to the utility grid can be down to 4 kWh (thus reduce 12 kWh of additional energy requirements) which in turn reduces the equivalent power loss in the network.

Game Theoretic Formulation of Coalition Formation in Present Invention

The present invention comprises a computer implemented process which will form the optimal coalition among microgrids given a distribution network profile and inter-microgrid distance threshold for a significant number of microgrids. The functionality is envisioned to be installed in utility energy management system to perform the dynamic coalition formation. Since the energy statuses of microgrids are subjected to change in each period, the coalitions are thus reformed and in turn producing different sets of cooperative microgrids.

The real-time operation requires very efficient methods of coalition formation. Since, the optimal coalition formation is an NP complete problem, fast and efficient coalition formation method is required. The microgrid-utility scenario in the distribution system is transformed into a coalitional game. The optimality of the invented process is ensured by applying coalitional game theory where each microgrid is considered as a player who will collectively reach to a Cooperative Equilibrium state. The present invention further comprises a computer implemented process which will provide the energy exchange scheme within a particular coalition of microgrids.

Utility Functions for Players in Coalition Formation Game

Let's denote the supply of microgrid i (where i ∈ N, N is the set of microgrid) is $S_i$ and the demand of i is $D_i$. Then the energy status of i is, $E_i = S_i - D_i$. In order to analyze the characteristics of the present invention method using coalitional game theory, the utility functions of the potential types of players need to be defined. Two types of players are pointed out in this microgrid coalition formation game, 1) the microgrids, 2) the coalition. The utility function measures the happiness a player receives after choosing a strategy. In this context, the strategy of a microgrid is to picking a coalition. The utility function for a microgrid is defined as

[Equation 1]

$$U_i = \frac{1}{1 + |S_i - D_i|} \quad (1)$$

The above equation suggests that a microgrid receives higher utility when its positive energy status is closing to 0, i.e. the difference between supply and demand is minimized. In order to describe the utility function of a coalition C, first the aggregated energy status $E_C$ is defined as

[Equation 2]

$$E_C = \sum_{i \in C} |D_i - S_i| \quad (2)$$

The potential loss occurs in energy transactions within the coalition C is

[Equation 3]

$$L_C = \sum_{\substack{i,j \in N_C \\ (i,j) \in ET_C}} \text{loss}(i, j) \quad (3)$$

Here $ET_C$ is the set of unique pairs (i,j) which states the energy transfer between microgrid i and microgrid j. The simplified loss function is defined as

[Equation 4]

$$\text{loss}(i, j) = I^2 R + T_{loss} = \left[\frac{P(E_{i,j})}{V}\right]^2 \times \alpha \cdot d(i, j) + \beta \cdot P(E_{i,j}) \quad (4)$$

Where V is the carrying line's voltage, $P(E_{i,j})$ is the power required to transfer $E_{i,j}$ amount of energy between i and j. α is the line resistance and $\beta$ is the transformer factor. Note that, when there is a transaction with utility grid, (in that case, either i or j is the utility grid, denoted by 0), there is a transformer otherwise $\beta$ is 0.

Finally the utility function for the coalition C is defined as,

[Equation 5]
$$U_C = \frac{1}{(1+E_C)} + \frac{1}{(1+L_C)} \quad (5)$$

Shapley Value Based Fair Division

Shapley Value is adopted in order to have a fair division of benefit among microgrids in a coalition. Shapley Value can calculate the average marginal contribution of a particular microgrid to the benefit achieved by the corresponding coalitions. The standard definition of Shapley Value is given by following equation

[Equation 6]
$$\psi_i(N, v) = \sum_{S \in N \setminus \{i\}} \frac{|S|!(|N|-|S|-1)!}{|N|!}[v(S \cup i) - v(S)] \quad (6)$$

The Shapley Value requires the definition of a characteristic function which will help to measure up the valuation of a coalition. In this context, the characteristic function should calculate the maximum energy transfer reduction with utility grid in a coalition. Therefore, the characteristic function is defined as

[Equation 7]
$$v(C) = \sum_{i \in C} |E_i| - \left|\sum_{i \in C} E_i\right| \quad (7)$$

The optimal coalition formed by the present invention will try to maximize the characteristic function. Typically the optimality of coalition formation can only be achieved by complete enumeration of items. Therefore, for optimal microgrid coalition formation methods have to go through all possible combinations of microgrids (i.e. a set of $2^N$ items) which are computationally expensive. The present invention method of coalition formation proved to form optimal coalition quickly and hence provide a real-time energy management scheme for utility EMS. The optimality of the formed coalition is proved by applying coalitional game theoretical analysis.

DESCRIPTION OF EMBODIMENTS

Hereinafter, some exemplary embodiments of the present invention including the models, methods and numerical test results are described in details with reference to the accompanying drawings.

Modeling Distribution System for the Invention

Generally, microgrids are operated in grid-connected mode. That is, when the microgrid requires energy to meet its internal demand, the utility grid provides the additional energy. At the same way, whenever a microgrid has surplus of energy, it will sell the energy to utility grid. Therefore, the traditional distribution system architecture is composed with bi-directional energy and electricity communication between a microgrid and the utility company/grid.

Figure 1:
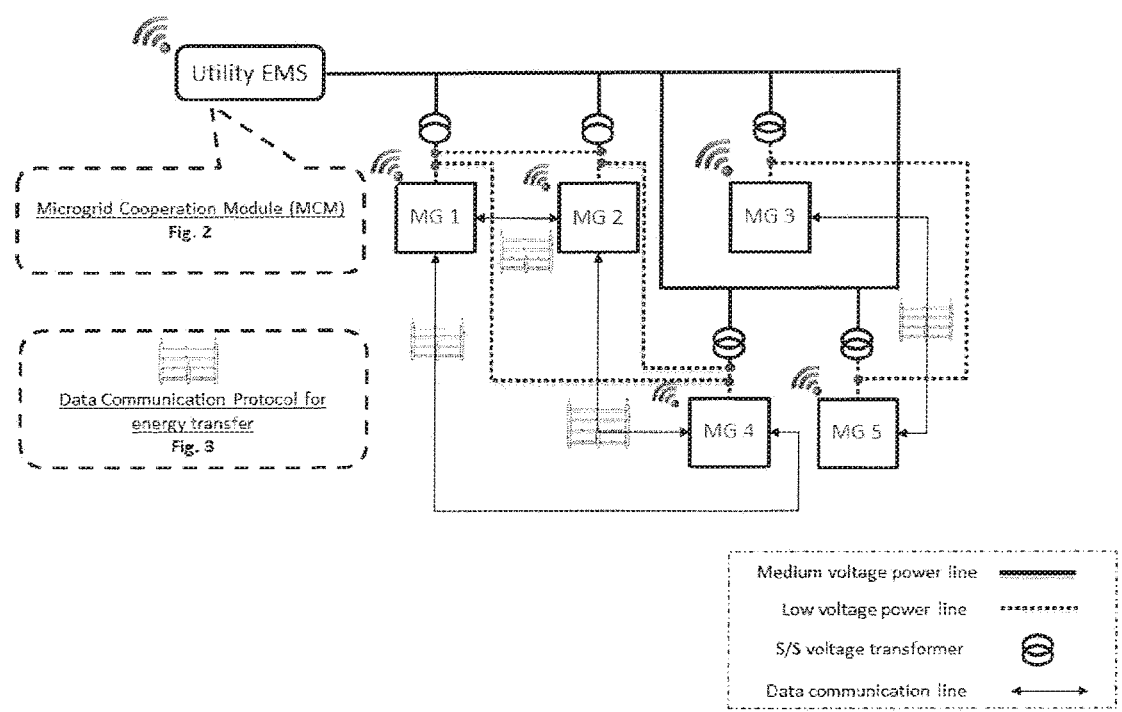
FIG. 1 is a perspective view of a communication interfaced (e.g. wireless) distribution system comprising several microgrids and utility system connected by medium and low voltage lines.

The high level exemplary distribution system diagram is shown in FIG. 1. The exemplary system consists 5 microgrids each of which is connected to the utility grid via a medium voltage line. The real time energy status (in a form of signal) from each microgrid to utility energy management system (EMS) will be conducted through communication line. The utility EMS can, at the same time, send appropriate signals to microgrids via communication line. A subset of microgrids can be connected with each other via low voltage line. Depending on the geographical location and spatial configuration, these low voltage lines are established. These physically connected microgrids can establish communication chat via communication infrastructure (the details will be described in FIG. 3).

Differences with model described in Prior Art 2:

The system depicted in the Prior Art 2 also contains several microgrids connected with one utility company via electric lines with different voltage level. However, the communication infrastructure, network architecture and system model is quite different than that of the invented model. The significant differences are:

1. In Prior Art 2, the microgrids operate in distributed fashion, where every microgrid has to report its energy status as well as spatial information to every other microgrid in the network. Such infrastructure is highly vulnerable to security leak and yields reliability issue. In the present invention, the microgrids only report their "energy status" to the utility EMS (which requires minimum communication and is considered sufficiently reliable and secure since microgrids are sharing bare minimum information to utility company).

2. In Prior Art 2, coalition formation intelligence needs to be installed in every microgrid (possibly, in smart meter or other microgrid energy unit; it is not clear from the description of Prior Art 2). In the present invention, the intelligence of coalition formation and energy exchange is located centrally to utility EMS (more precisely, in MCM).

Detailed Description of the Invented Functional Units in MCM

Figure 2:
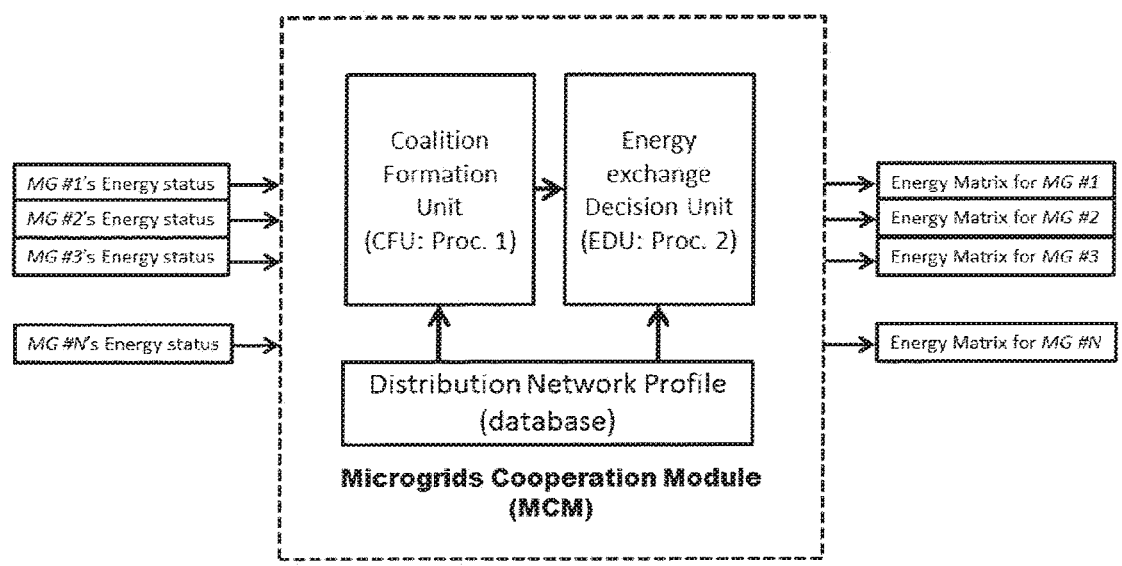
FIG. 2 shows the functional units in Microgrids Cooperative Module (MCM) which is located in utility energy management system.

The designed functional unit which hosts the coalition formation and energy exchange management methods in utility EMS is detailed in FIG. 2. The utility EMS is typically responsible for optimized energy operation of the distributed system under that particular utility company. The utility EMS periodically receives energy status information from microgrids via communication line (as shown in FIG. 2). The Microgrid Cooperation Module (MCM) contains two functional units, 1) Coalition Formation Unit (CFU), and 2) Energy exchange Decision Unit (EDU). The distribution network profile will provide spatial information to both of these subunits for performing respective tasks. Such information will be kept in a localized database which will be updated when necessary. Upon receiving energy status information from microgrids, the coalition formation subunit will form the optimal coalition of microgrids which will minimize the energy exchange with utility company, maximize the inter-microgrid energy transfer. After achieving optimal coalition, the EDU will determine the potential optimal energy exchange energy exchange among microgrids. This unit will produce an Energy Transfer matrix and break it down to microgrid level. Associated signal and table are then sent to corresponding microgrid via communication network. The signal contains either "send energy" or "receive energy" followed by a table of energy amount to perspective other microgrids (FIG. 2).

Coalition Formation Unit (CFU)

Figure 4:
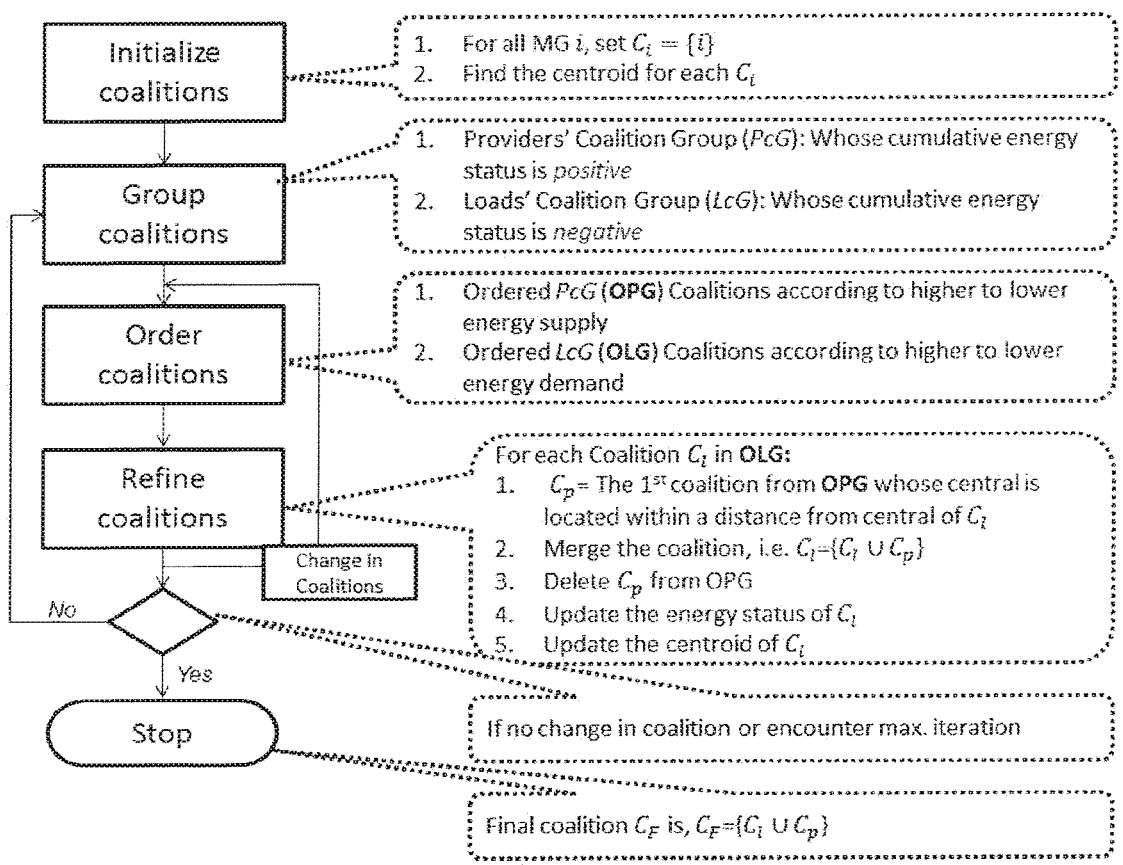
FIG. 4 is the process flow of Coalition Formation Unit (Proc. 1 in FIG. 2)

The detailed process flow of CFU is shown in FIG. 4. The process basically tries to pair up two existing coalitions, one with the highest aggregated load and another with highest aggregated supply, (if their centroids are locating within a predefined proximity) until no possible updates in coalitions can possible. The invented coalition mechanism can be named as Hierarchical Priority based coalition formation or "HR Coalition". Apparently, i is a load microgrid iff $E_i<0$ or a provider microgrid iff $E_i>0$.

Step 1: The process stats with initialization step where all participating microgrids are treated as individual coalition and their centroids are their actual location.

Step 2: Next step is to group the coalitions into two sets, 1) the load group containing the microgrids with negative energy status (LcG) and 2) the provider group containing positive energy status (PcG). The 3rd and 4th steps will be in repeat as long as there is a change in coalitions.

Step 3: The 3rd step orders LcG according to high to low of the load demand (OLG) and PcG according to high to low of supply (OPG).

Step 4: The 4th step contains several sub-steps. For each coalition $C_1$ in OLG $C_p$ is 1st coalition in OPG whose central is located within the proximity of $C_1$. If no such $C_p$ is found in OPG, make no change and scan the next $C_1$ on the list.

Integrate the coalitions $C_1$ and $C_p$ into $C_1$

Remove $C_p$ from PcG

Update the energy status and centroid information of $C_1$

The process goes back to Step 3 if there is any change in any of the coalitions

Step 5: Check whether there is still a change in coalitions. If so (i.e. some coalitions are updated), the process goes back to Step 2.

Step 6: Terminates with the final coalition $C_f = C_1 \cup C_p$

Energy Exchange Decision Unit (EDU)

Figure 5:
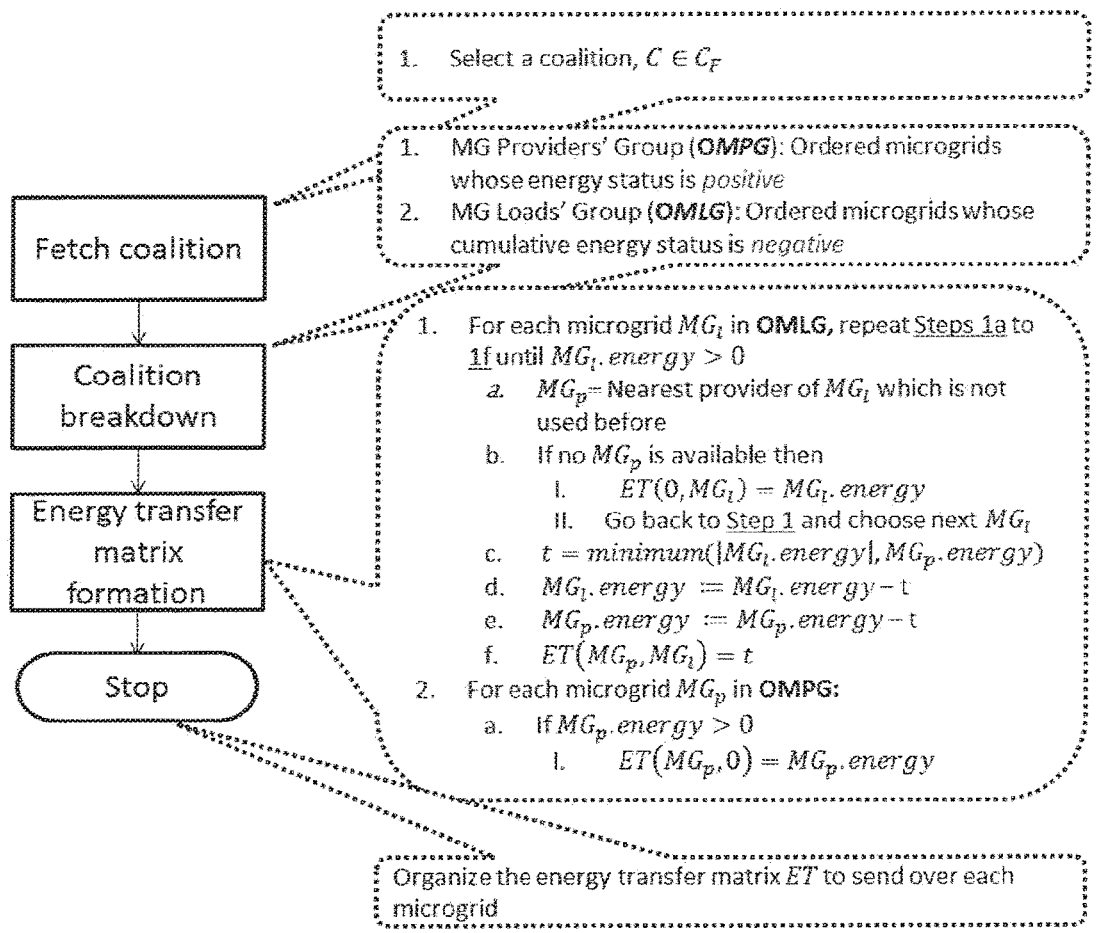
FIG. 5 is the process flow of Energy Exchange Decision Unit (Proc. 2 in FIG. 3)

The CFU then sends the final microgrid coalitions $C_f$ to the EDU in order to determine energy transfer matrix. The process in CFU can be interpreted as a Hierarchical priority based intelligent coalition scheme (HR Coalition). The detailed process flow of EDU is shown in FIG. 5. In each coalition, EDU basically forms a 1 to 1 mapping between a load microgrid and a supply microgrid who are locating within a proximity threshold. Before, the mapping process starts, EDU orders the microgrids according to their energy status The load microgrids are ordered according to higher load to lower load The supplier microgrids are ordered according to higher supply amount to lower supply amount.

Such technique will ensure maximum possible energy transfer within microgrids.

Algorithmic Complexity of Optimal Coalition Formation and Comparison

Optimal coalition formation of microgrids will ensure minimized power loss and well as maximized inter-microgrid energy exchange. Forming such coalition, however, is computationally intensive as the number of microgrids grows higher and inherently complex given a distribution network profile. The conventional mathematical optimization method (such as Linear programming) can ensure the optimality provided the correct mathematical model is formulated. However, the complexity of such method is exponential with the number of microgrid. To be more precise, since the method has to check all possible combination, the algorithmic complexity is $O(2^{|N|})$. Thus Optimal Coalition formation is an NP-Complete problem. Therefore, it is computationally almost impossible to perform optimal coalition formation using mathematical optimization methods when the number of microgrids exceeds a particular threshold. Moreover, as pointed before, the game theoretic merge/split operation is an NP-hard problem. Thus, it is impossible to solve the operation in a polynomial time, if the number of microgrids is higher than a specific number. Applying some heuristics and assumption (as done in Prior Art 2), the complexity can be brought down to a tolerable range. However, even the reduced complexity of merge and split is not sufficient enough to be applicable in a real-time operation with a very high number of microgrids. On the other hand, the invented coalition formation algorithm (namely HR Coalition) is a priority based hierarchical scheme, which tries to form coalition based on the energy status of the microgrid. The computational complexity of HR Coalition, therefore, is $O(|N|^2)$.

The communication complexity of merge/split operation used in Prior Art 2 is $O(|N|^3)$ since every microgrid has to communicate with every other microgrid in order to receive the energy and network information and again in transfer of energy. The present invention, on the other hand, has a worst case communication complexity of $O(|N|^2)$. Because, after deciding the energy transfer between the microgrids, each microgrid has to communicate its corresponding microgrid only one time.

Description of the Invented Protocols for Inter-Microgrid Communication

Figure 3:
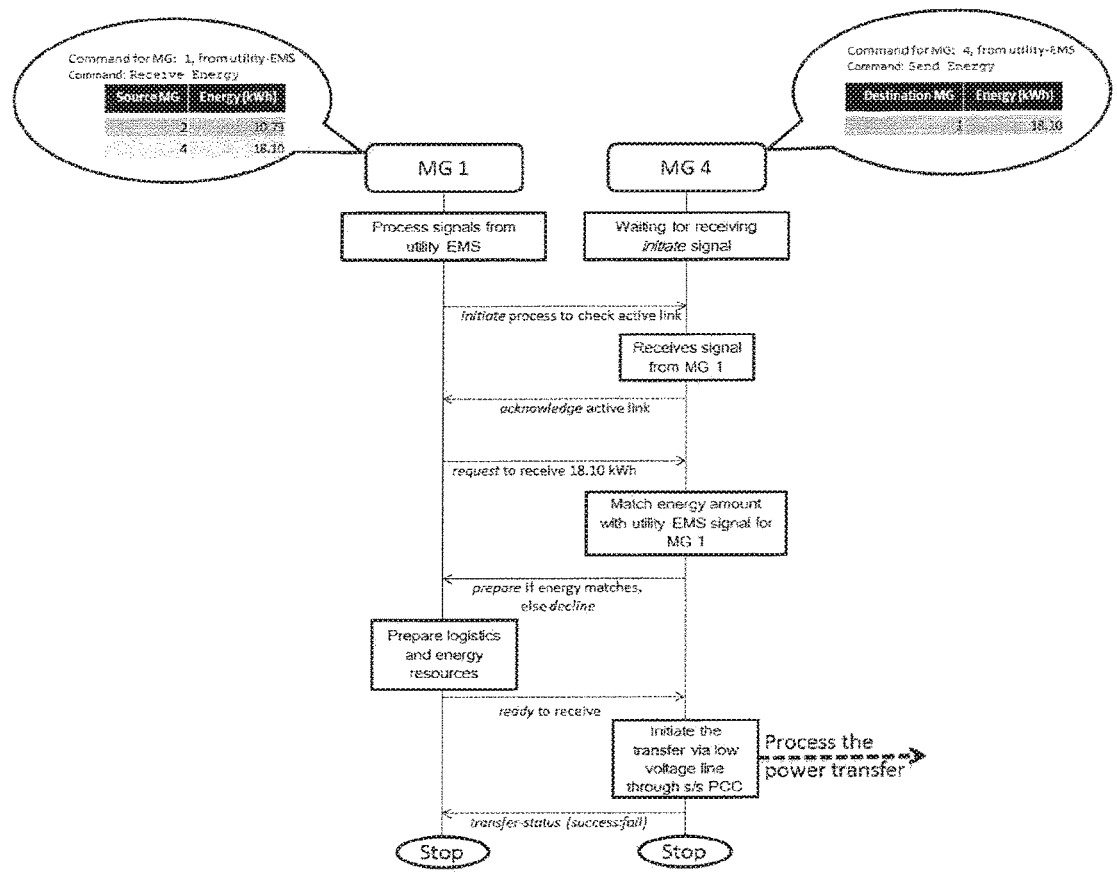
FIG. 3 is an exemplary communication sequence diagram for energy exchange between two microgrids.

An exemplary simplified communication sequence diagram for processing energy transaction between two microgrids is shown in FIG. 3. The communication protocol is assumed to be synchronous. Both of the communicating microgrids first receive the signal and energy transaction table from utility EMS. The load microgrid (MG 1, in FIG. 3) initiates the communication while the provider microgrid (MG 4, in FIG. 3) is waiting for any load microgrid to send "initiate" signal. The "initiate" signal also checks whether the communication link is active or not. After receiving the signal, MG 4 acknowledges. MG 1 then sends a "request" signal with the energy amount it requires from MG 4 (which was initially sent by the utility EMS). Upon receiving the "request" signal, MG 4 checks the energy amount with the same one it receives from utility EMS. Ideally, these two amounts are supposed to be same. MG 4, however, can decline the request if the energy amount signal it receives from MG 1 is not as same as the energy amount signal from utility EMS. In case, these signals are matched, MG 4 sends a "prepare" signal to MG 1, stating MG 1 to prepare necessary hardware and logistics (the substation equipment, necessary switches, circuit breakers, etc.) require to receive the power from MG 4. After preparation, MG 1 sends the "ready" signal to MG 4 stating that it is ready to receive energy (18.10 kWh, in this case). The provider microgrid (MG 4) then transfer power to load microgrid (MG 1) using the low voltage line connected between them. The communication terminates after MG 4 sends a "transfer-status" saying whether the transfer is a success or a failure.

Numerical Simulation and Analyses

In order to compare the effectiveness of the method in CFU, an equivalent distance based clustering coalition scheme is implemented.

10 Microgrids and 100 Microgrids Cases

Figure 6:
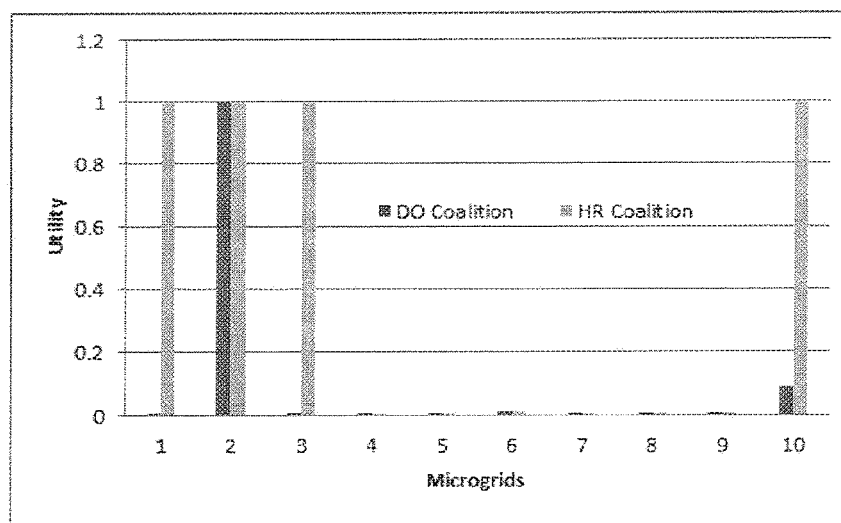
FIG. 6 is an exemplary figure showing increase in utility after Proc. 1 and Proc. 2 for a 10 microgrids distribution system.
Figure 7:
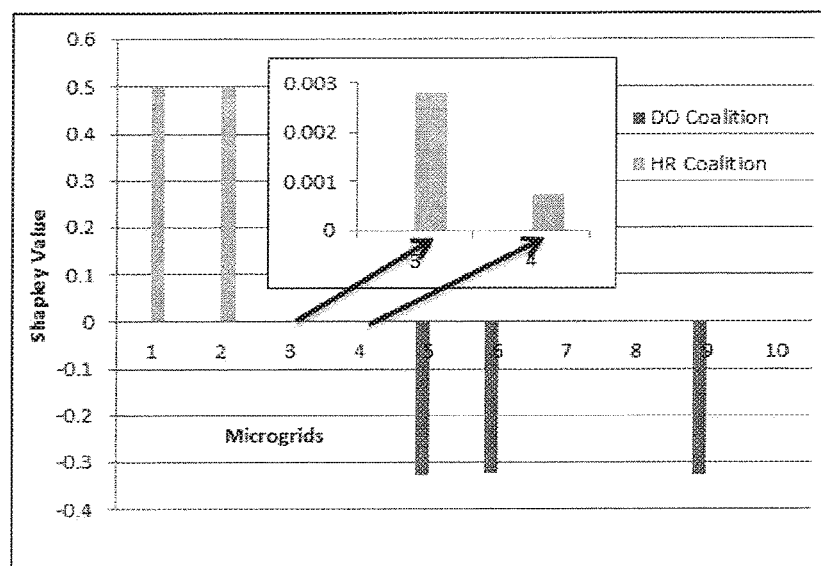
FIG. 7 is a figure showing increase in Shapley Value after Proc. 1 and Proc. 2 for a 10 microgrids distribution system using the same system data as of FIG. 6.
Figure 8:
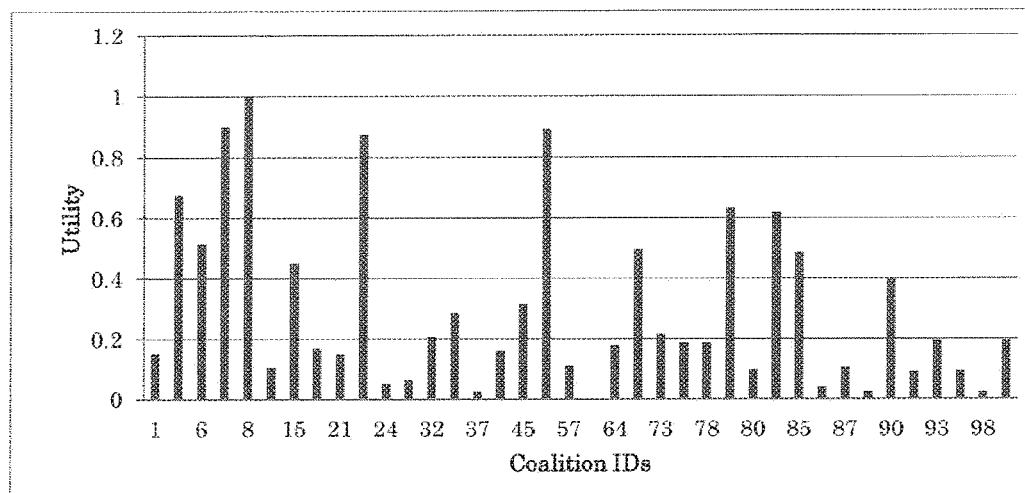
FIG. 8 is an exemplary figure showing utility values of coalitions in a 100 microgrids distribution system.

An exemplary case of 10 microgrids in a distribution system is considered. These microgrids are assumed to be scattered randomly over a 5 square kilometer area. The utility grid is assumed to be located at the center of the area. The intra coalition distance threshold is set to be 2.5 km. FIG. 6 shows utility of each microgrid after forming coalition. It is evident from the figure that, forming coalitions using HR coalition scheme effectively increases (or at least kept same) the utilities of microgrids. FIG. 7 describes the Shapley value phenomena. The microgrids are, once again, gained their marginal contribution by joining the coalition formed by HR Coalition scheme invented as CFU. Another exemplary case of 100 microgrids spaced over 10 km with an internal coalition centroid distance threshold of 1.5 km is considered. The number of coalitions formed is 38. The utility for each coalition is printed in FIG. 8.

Power Loss Phenomena

Figure 9:
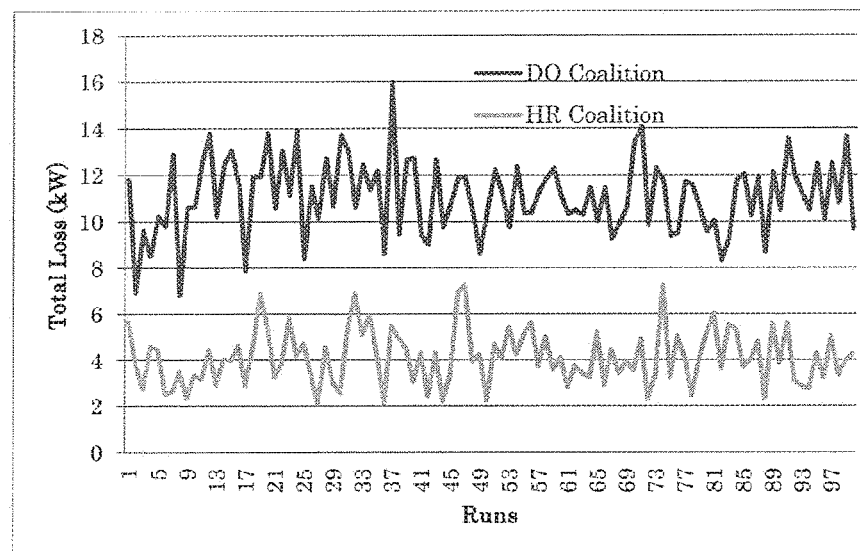
FIG. 9 is an exemplary power loss reduction comparison for a 200 microgrids distribution system.
Figure 10:
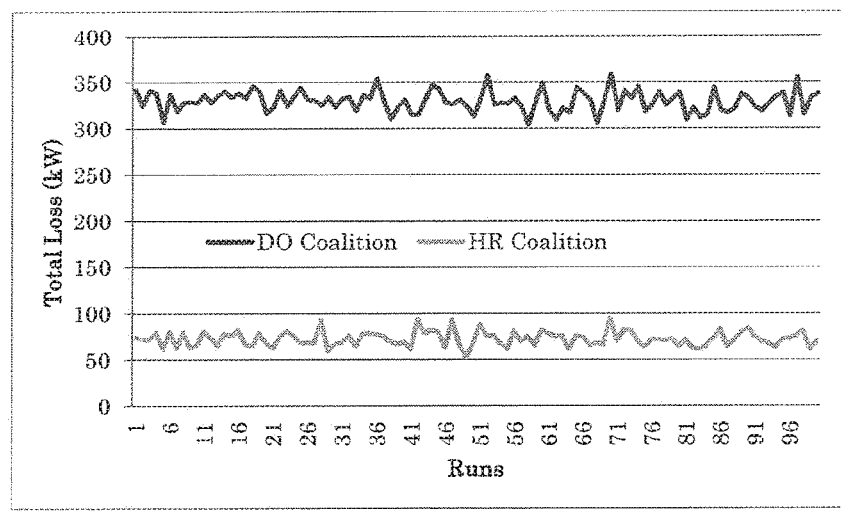
FIG. 10 is an exemplary power loss reduction comparison for a 500 microgrids distribution system.
Figure 11:
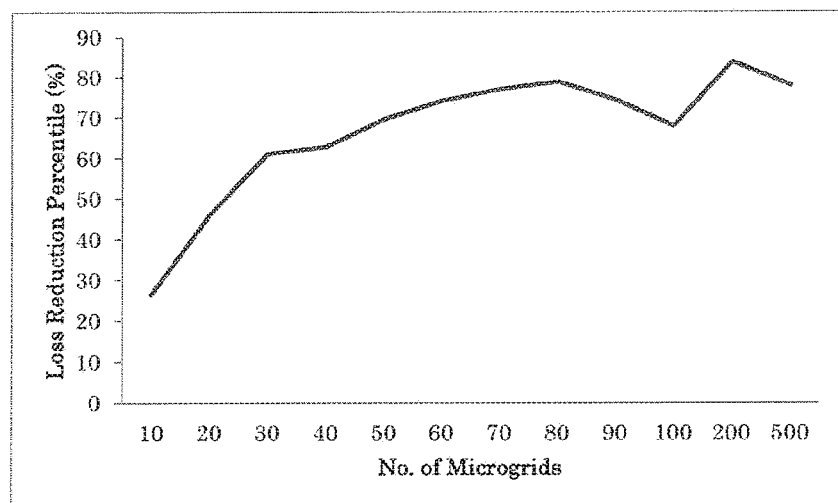
FIG. 11 is a summarized power loss phenomena for different scaled distribution system.

The power loss reduction phenomena realized by the invented CFU and EDU are shown in FIG. 9, FIG. 10 and FIG. 11 for some exemplary systems. FIG. 9 describes the reduction of power loss achieved by the 10 microgrid case and a comparison with equivalent DO Coalition scheme. The result is conducted by running both of these methods for 100 times. The HR Coalition scheme (in CFU) effectively reduces the loss of power within the network in almost most of the (86%) times. The average loss reduction is 26%. FIG. 10 shows the loss reduction phenomena when the number of microgrids is 500. It is very interesting to see, in this case, the loss is reduced (significantly) in all of the runs (100%). Moreover, the average loss reduction is also improved to 77%. Therefore, the coalitions formed by CFU scheme are scalable and performs better with higher scaled system. To summarize the loss reduction phenomena, FIG. 11 is presented. This figure portrays the average percentage of power loss reduced after applying HR Coalition scheme for different sized system. As the system size grows, the invented HR coalition scheme reduces the power loss in the network. Another noteworthy point needs to be mention is that the average loss per microgrid is also reduced with the system size. Precisely speaking, the average loss per microgrid in 10-microgrid case is 0.20 kW while the same in 500-MG case is 0.14 kW while performing coalition formation through CFU for both of the cases.

Average Execution Time Pattern

Figure 12:
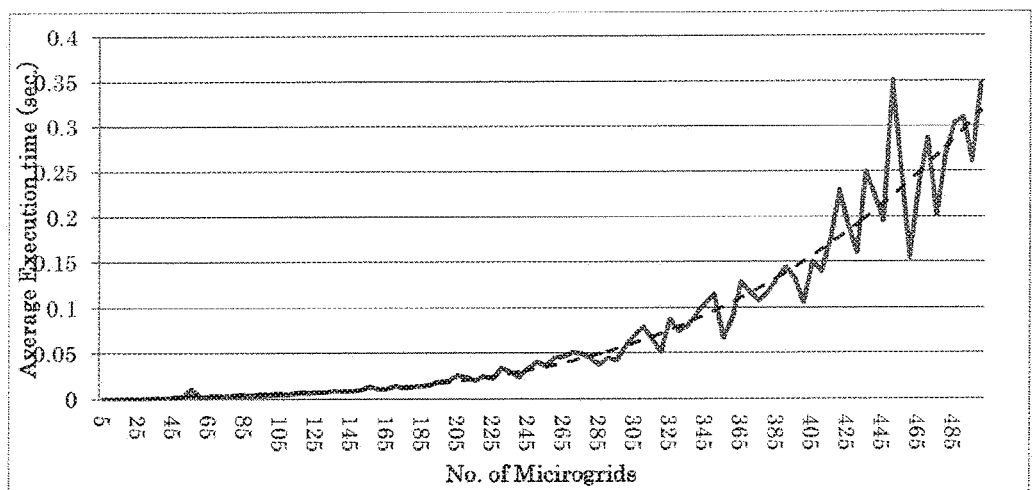
FIG. 12 is the pattern of average execution time (AET) with the size of the distribution system (from exemplary 5 microgrids to 500 microgrids system).

The pattern of average execution time (AET, in seconds) of forming coalitions is shown in FIG. 12. The processes in CFU and EDU are conducted 100 times each over a hypothetical distribution network of 5 microgrids to 500 microgrids (with a step size of 5). FIG. 12 suggests that the AET has a quadratic relationship with number of microgrids. Compared with the conventional coalition formation method (which yields an exponential relationship between AET and number of microgrids), the invented method is supremely fast. Hence, the invented method can be effectively applicable in real time.

The invention claimed is:

1. An electricity distribution system comprising several microgrids and one utility company where each microgrid must be electrically connected with the utility company via a medium voltage line and each microgrid is connectable with other microgrids via a low voltage line; and the utility company and microgrids are interfaced with each other via a communication network, the utility company comprising:

a first processor configured to form a coalition of microgrids which minimize an amount of power that is exchanged between the utility company and the microgrids via the medium voltage line and which maximize an inter-microgrid amount of power that is transferred via the low voltage line upon receiving power status information, that indicates whether the microgrids requires an amount of power or whether the microgrids has a surplus amount of power, from microgrids via the communication network, and a second processor configured to produce a power transaction matrix, which is transferred via the low voltage line, based on the coalition of microgrids and that transmits the power transaction matrix to the microgrids via the communication network, wherein the each microgrid has a load microgrid which requires power and a provider microgrid which has surplus of power, the load microgrid and the provider microgrid receive the power transaction matrix from the utility company via the communication network, the load microgrid transmits a request signal to the provider microgrid via the communication network, the request signal making a request for the amount of power that is insufficient, and the provider microgrid transfers the power that is insufficient to the load microgrid via the low voltage line upon receiving the request signal.

2. The electricity distribution system as set forth in claim 1, wherein the provider microgrid waits for the load microgrid to send a communication initiate signal to the provider microgrid after receiving the power transaction matrix.

3. The electricity distribution system as set forth in claim 2, wherein
the provider microgrid acknowledges the load microgrid after checking whether or not the communication network is active upon receiving the communication initiate signal.

4. The electricity distribution system as set forth in claim 1, wherein
the provider microgrid matches an amount of power that is requested by the load microgrid and an amount of power that is indicated in the power transaction matrix and sends a prepare signal to the load microgrid, instructing the load microgrid to prepare to receive the amount of power that is insufficient if the amount of power that is requested by the load microgrid and the amount of power that is indicated in the power transaction matrix are the same.

5. The electricity distribution system as set forth in claim 4, wherein
the provider microgrid transfers power that is insufficient to the load microgrid via the low voltage line upon receiving a ready signal that indicates, in response to the prepare signal, that the load microgrid is ready to receive the amount of power that is insufficient, from the load microgrid.

6. An electricity distribution method for an electricity distribution system comprising several microgrids and one utility company where each microgrid must be electrically connected with the utility company via a medium voltage line, and where each microgrid is connectable with other microgrids via a low voltage line, and where each microgrid has a load microgrid which requires an amount of power and a provider microgrid which has surplus of power; and where the utility company and the microgrids interface with each other via a communication network, wherein the electricity distribution method comprises:
- a step that forms a coalition of microgrids which minimize the amount of power that is exchanged between the utility company and the microgrids via the medium voltage line and which maximize the inter-microgrid amount of power that is transferred via the low voltage line upon receiving power status information from the microgrids via the communication network by the utility company that indicates whether the microgrids require an amount power or whether the microgrids have a surplus amount of power,
- a step that produces a power transaction matrix, which is transferred via the low voltage line, based on the coalition of microgrids and that transmits the power transaction matrix to the microgrids via the communication network by the utility company,
- a step that receives the power transaction matrix from the utility company via the communication network by the load microgrid and by the provider microgrid,
- a step that transmits a request signal to the provider micrograid via the communication network using the load microgrid, the request signal requesting the amount of power that is insufficient, and
- a step that transfers the amount of power that is insufficient to the load microgrid via the low voltage line upon receiving the request signal via the provider microgrid.

7. A non-transitory computer-readable medium that stores a computer-executable program for an electricity distribution system comprising several microgrids and one utility company where, each microgrid must be electrically connected with the utility company via a medium voltage line and where each microgrid is connectable with other microgrids via a low voltage line, and where each microgrid has a load microgrid which requires an amount of power and a provider microgrid which has a surplus amount of power; and where the utility company and microgrids interface with each other via a communication network, wherein the computer program comprises instructions for:
- a procedure that forms a coalition of microgrids which minimize the amount of power that is exchanged between the utility company and the microgrids via the medium voltage line and which maximize the inter-microgrid amount of power that is transferred via the low voltage line upon receiving power status information from the microgrids via the communication network that indicates whether the microgrids require an amount of power or whether the microgrids have a surplus amount of power,
- a procedure that produces a power transaction matrix, which is transferred via the low voltage line, based on the coalition of microgrids and that transmits the power transaction matrix to microgrids via the communication network,
- a procedure that receives the power transaction matrix from the utility company via the communication network,
- a procedure that transmits a request signal that requests an amount of power that is insufficient to the provider microgrid via the communication network, and
- a procedure that transfers the amount of power that is insufficient to the load microgrid via the low voltage line upon receiving the request signal.

* * * * *